INVENTOR.
Joseph H. Taylor

Nov. 5, 1957

J. H. TAYLOR 2,811,911

TRACTOR DRAWN PLOW CONSTRUCTION

Filed Aug. 26, 1952

INVENTOR.
Joseph H. Taylor.
BY
Lancaster, Allwine & Rommel
Attorneys

INVENTOR.
Joseph H. Taylor
BY
Lancaster, Allwine Rommel
Attorneys

Nov. 5, 1957  J. H. TAYLOR  2,811,911
TRACTOR DRAWN PLOW CONSTRUCTION
Filed Aug. 26, 1952  7 Sheets-Sheet 6

INVENTOR.
Joseph H. Taylor
BY
Lancaster, Allwine and Rommel
Attorneys

Nov. 5, 1957 J. H. TAYLOR 2,811,911
TRACTOR DRAWN PLOW CONSTRUCTION
Filed Aug. 26, 1952 7 Sheets-Sheet 7

Inventor
Joseph H. Taylor

United States Patent Office 2,811,911
Patented Nov. 5, 1957

1

2,811,911

TRACTOR DRAWN PLOW CONSTRUCTION

Joseph H. Taylor, Athens, Tenn.

Application August 26, 1952, Serial No. 306,337

4 Claims. (Cl. 97—47.1)

This invention relates to improvements in tractor drawn plow constructions.

The primary object of this invention is the provision of an improved plowing implement having automatic means for controlling the furrow wheel under such conditions that the plow discs will be regulated as to plowing depth and tractor alignment under various plowing conditions.

A further object of this invention is the provision of a tractor drawn plow having improved means for automatic lateral movement of a furrow wheel in order to keep the plow in alignment with respect to the tractor while making turns or traveling on curves, and including means for limited vertical movement of the furrow wheel, to take care of ground unevenness and soil conditions as they vary due to plowing in loose soil, sandy soil, or in hard clay.

Other objects and advantages of this invention will be apparent during the course of the following detailed description.

In the drawings, forming a part of this specification, and wherein similar reference characters designate corresponding parts throughout the several views:

Fig. 13 is a fragmentary view on line 13—13 of Fig. 1, looking forwardly, showing the connections of the manual and automatic controls upon the tractor frame.

2

Figure 1:
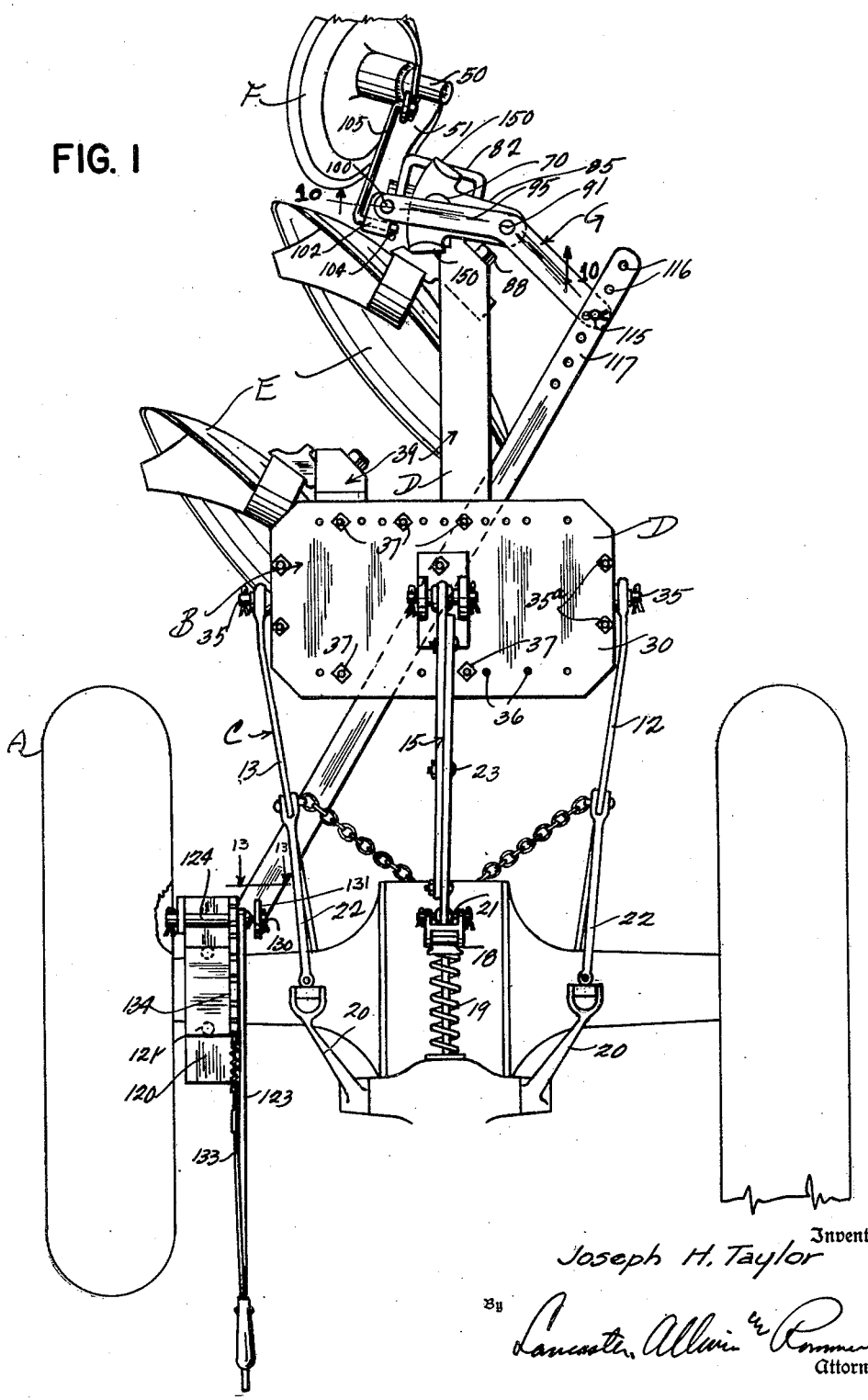
Fig. 1 is a plan view of the plow showing it connected to a tractor.

In the drawings, wherein for the purpose of illustration are shown preferred and modified forms of the invention, the letter A may generally designate a tractor with which the plow construction or implement B is intended to be used; being connected therewith by a conventional hitch mechanism C. The implement B preferably includes a frame D, plows E and their connecting structures; furrow wheel F, and means G for the mounting and control of the furrow wheel F with respect to the frame D and the tractor A.

The implement B is adaptable for connection to different types of power operated tractors. The one shown in the drawings includes a rear axle housing 10 with wheels 11. The latter are power actuated for drive of the tractor. The hitch linkage C preferably includes a pair of tension links 12 and 13 swivelly connected at 14 to the sides of tractor frame in order that they can swing up and down and move laterally within predetermined limits. An upper compression link 15 is swivelly connected at 16 to the control compression member 18. The latter includes a spring 19. This type of connection measures reaction forces of ground tools applied through the top linkage 15 and automatically regulates the action of the hydraulic mechanism of the tractor. The power lift mechanism of the tractor includes a set of crank arms 20 having a universal swivel connection at 21 with lift links 22. The latter are swivelly connected at 23 intermediate the ends of the tension links 12 and 13, in a manner well known in this art. The compression or top link 15 is of two part construction and length adjustable by means of bolts 23. One part is pivotally connected at 16 to the member 18, and the other part is pivotally connected to the frame of the plow implement B in a manner to be subsequently described.

Referring to the implement frame construction D, the same includes a heavy metal body plate 30 having a vertical standard 31 bolted at 32 thereto. The upper end of standard 31 is bifurcated and pivotally and swivelly connected at 33 with one of the parts of the compression link 15. The frame body plate 30 is provided at the sides thereof with depending lugs 34 detachably connected at 35ª to the base plate. These lugs 34 have swivel connections at 35 with the rear ends of the tension links 12 and 13. The frame body 30 along the front and rear edges thereof is provided with a line of openings 36 for selectively receiving bolts 37 by means of which to detachably connect plow supporting beams 39. The latter are of L-shaped formation including the horizontal portions 40 provided with vertical openings therethrough by means of which to connect the same to the underside of the frame body 30 by means of the bolts 37. The rear ends of the horizontal portions 40 are downwardly curved and angled to provide vertical portions 42 for detachable connection of the plows E therewith. The discs E are provided with spindles having antifriction bearings in the hub portions 45 thereof. These hub portions 45 have upstanding plow beam connecting shanks 46 detachably receiving bolts 47 by means of which to connect the same to the beam portions 42. The beams 39 are of different lengths, in order to provide for offsetting of the plow discs E, and they may be connected selectively as to number and lateral placement.

Referring to the furrow wheel assemblage and its associated structure, the furrow wheel F may be of any approved type. It is rotatably mounted upon a pintle 50 extending laterally at the appropriate angle off horizontal upon the rear end of a furrow wheel lever or supporting arm 51.

Figure 3:
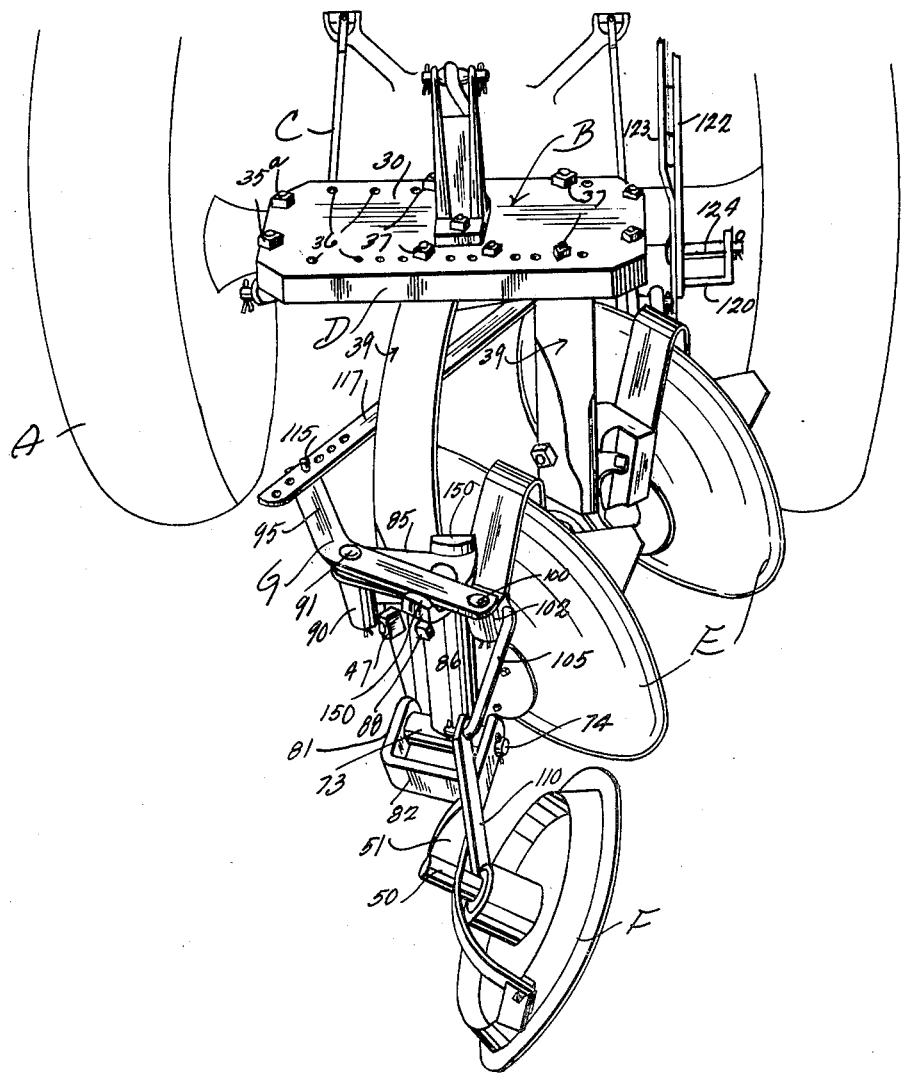
Fig. 3 is a perspective view showing the implement in its lifted position upon a tractor.
Figure 4:
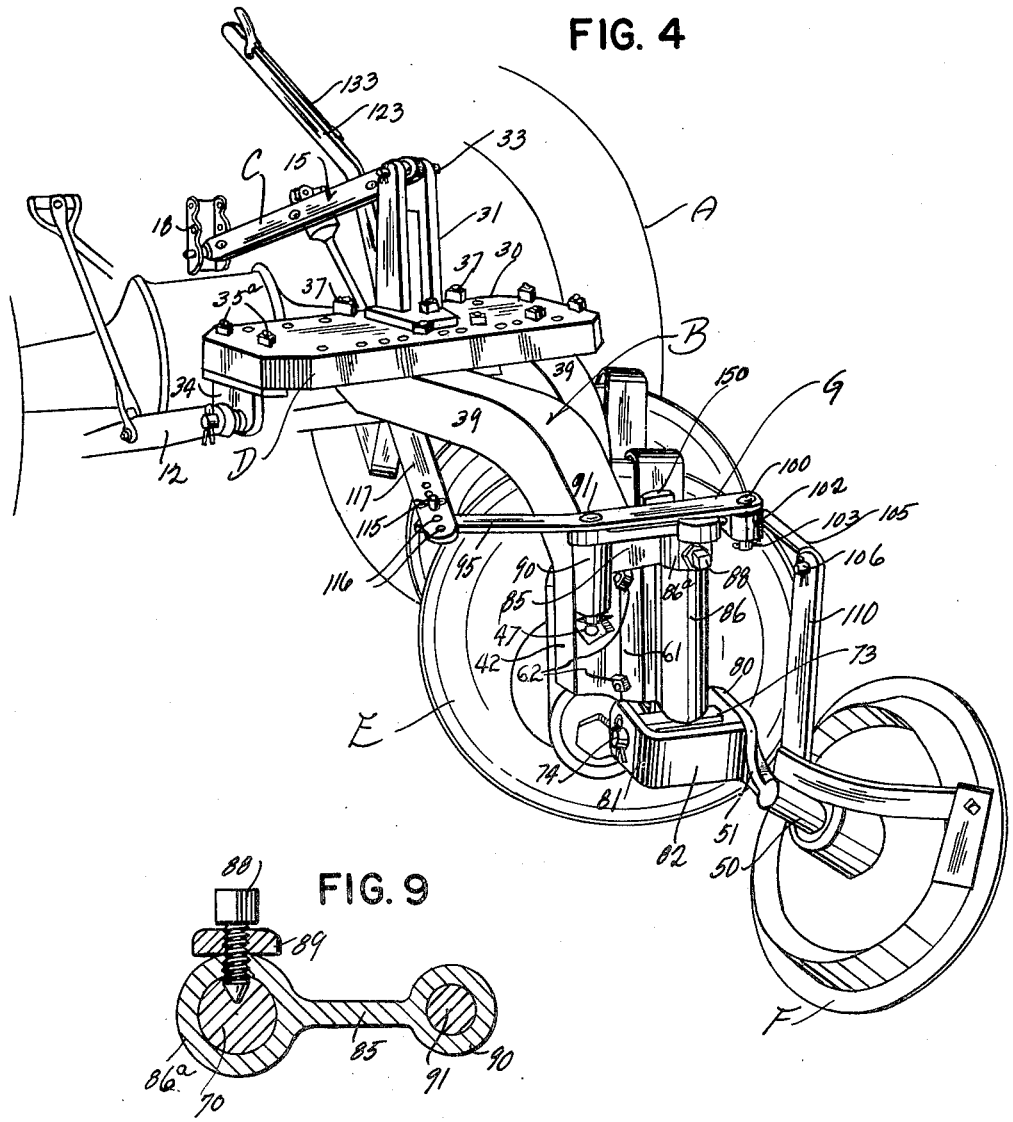
Fig. 4 is a perspective view showing more particularly the level position of the plow discs and improved furrow wheel control means.
Figure 10:
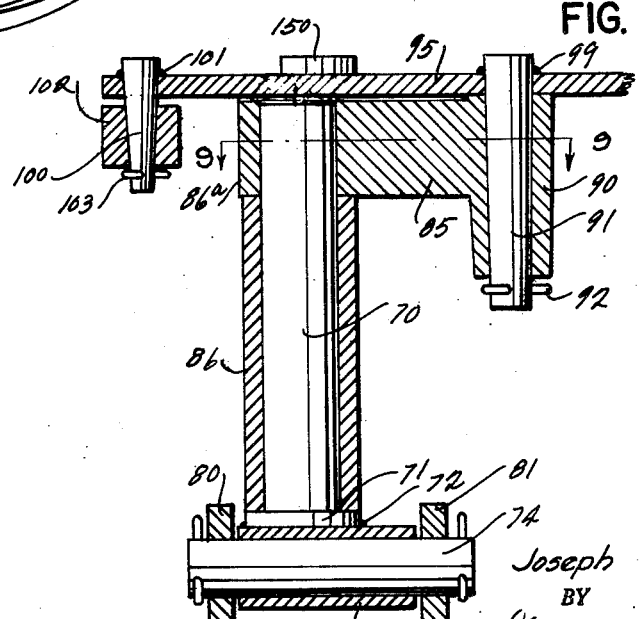
Fig. 10 is a cross sectional view taken through the control mechanism for the furrow wheel, substantially on the line 10—10 of Fig. 1.
Figure 6:
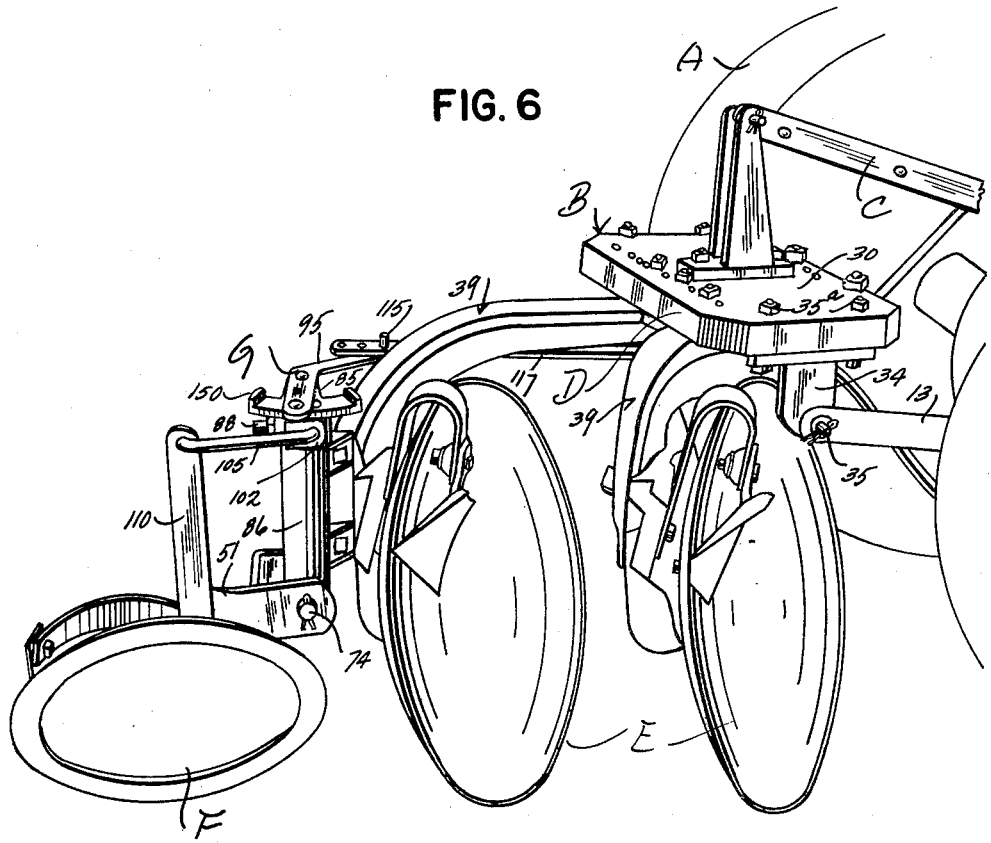
Fig. 6 is a perspective view showing the improved plow construction from the right side in level position with respect to the tractor.

The mounting and control means G for the furrow wheel F preferably includes a plow frame attaching bearing sleeve 86 having a laterally extending flange 61 which may be bolted as at 62 to an angled portion 63 (see Fig. 8) provided upon the depending portion 42 of the rearmost plow beam 39, see Fig. 4. The sleeve 86 assumes substantially a vertical position, as is shown throughout the drawings and it is fixed with respect to the plow frame. Within it there is disposed a rotatable shaft 70 the lower end of which has an enlarged flange 71, the bottom of which is welded at 72 to a horizontal sleeve 73, as shown in Fig. 10. This sleeve 73 rotatably receives a horizontal shaft 74. Upon the ends of shaft 74 are rotatably mounted a leverage mechanism by which the furrow wheel F may be raised and lowered. As is shown quite clearly in Figs. 3 and 4, this leverage mechanism includes the lever arm 51 secured to the pintle 50 of the furrow wheel. It is bifurcated forwardly and includes the portions 80 and 81 which are pivoted to the outer extending ends of the shaft 74 (see Fig. 10). The part 81 is connected by a cross piece 82 with the lever arm 51 and forms a part thereof. It will be readily understood that the lever 51 enables the furrow wheel to be raised and lowered upon the shaft 74.

Figure 9:
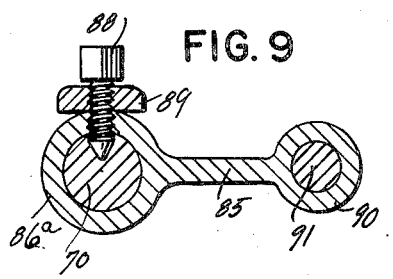
Fig. 9 is a cross sectional view of the control mechanism, taken on the line 9—9 of Fig. 10.
Figure 7:
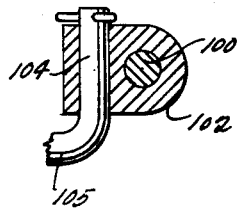
Fig. 7 is a cross sectional view taken through a link connection of the control linkage for the furrow wheel.

The mounting and control means G also includes a laterally extending arm 85 which has a sleeve portion 86a at one end, as shown in Fig. 9, receiving a bolt 88 by means of which to key the arm 85 to the vertical shaft 70. A lock nut 89 aids in securement. The end of the lever 85 remote from its connection with shaft 70 is provided with a bearing sleeve 90 rotatably supporting therein a tapered vertically disposed shaft 91 (see Figs. 9 and 10). It is detachably held in place by a cotter pin 92. The upper end of the shaft 91 projects above the top of the lever 85 and the sleeve 90 and there is rigidly connected or keyed to a control lever 95, intermediate the ends of the latter. This control lever 95 at one of its outer ends is provided with a depending tapered shaft 100 welded or keyed to said lever 95 at 101 on normally a vertical axis. Upon shaft 100 is rotatably supported a swivel block 102. It is detachable from the shaft 100 by means of a cotter pin 103. The swivel block 102, as shown in Fig. 7, includes a lateral portion which is transversely apertured for receiving a horizontal arm 104 of a link 105. This link 105 at its opposite end is laterally turned at 106 and pivoted to the upper end of a lever 110. The latter in turn is welded or otherwise fixedly secured to the rear end of lever 51.

Inasmuch as the laterally extending lever arm 85 is keyed to the shaft 70, movement fore and aft of the outer end of arm 85 will rotate the vertically disposed shaft 70. Since the latter has a lower sleeve portion 73 (in which the shaft 74 bears) rigidly connected thereto, such turning of the shaft 70 will rotate the sleeve 73 about the vertical axis of the shaft 70, and this will move the furrow wheel laterally to change the angled position thereof.

Figure 2:
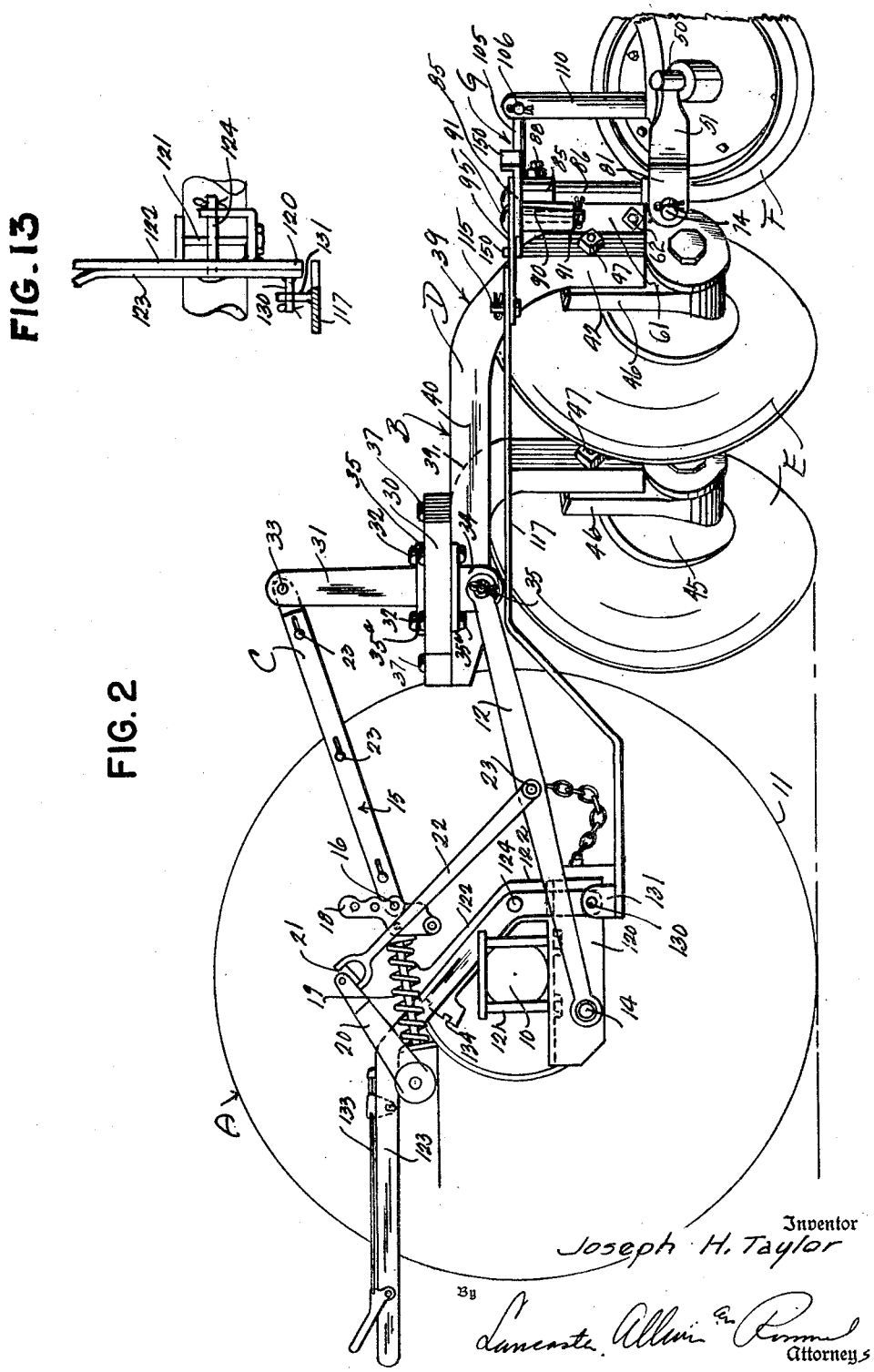
Fig. 2 is a side elevation of the plow showing tractor draft and hitch connections therefor.

The control arm 95 at the opposite side of the pivot 91 from the lifting and lowering linkage connection with the furrow wheel is provided with a pin 115. The latter can be placed in any of a plurality of openings 116 provided therefor in the rear end of the control connecting rod 117. Rod 117 extends forwardly and is pivotally connected to the right side of the tractor frame for the purpose of control operation of levers 85 and 95. The means provided for connecting the forward end of rod 117 to the tractor frame preferably includes an angled piece 120, shown in Figs. 2 and 13, detachably bolted to the axle housing 10 of the tractor by bolts 121. This angle piece 120 at its rear end is provided with a vertical standard portion 122 to which a manual control arm 123 is pivoted at 124. Lever 123 at its lower depending portion adjacent to the connecting angle 120 is provided with a fixed lateral stud or pin 130 to which a lug portion 131 on the rear end of the connecting lever 117 is loosely and pivotally connected. The manual lever 123 is provided with a detent mechanism 133 connected thereon, including a pawl (see Fig. 1) which operates upon the ratchet or rack 134 formed on the lever supporting arm 122, as a part thereof.

It can be seen from the foregoing that pivotal movement of lever 123 by the operator of the tractor, upon the pivot pin 124, will bodily move the connecting rod 117 either forwardly or rearwardly. This action, through connection of said rod 117 at 115 with the control lever 95 and the control linkage will operate the angled position of the furrow wheel. Due to certain turning actions and movements of the tractor, the fact that the control lever 95 is pivotally connected at 91 upon the outer end of the swinging arm 85 and due to the fact that axis of shaft 70 is fixed with respect to the plow frame, when the furrow wheel is in soil engaging position, such turning action will cause swinging of arm 85, within certain limits of movement, to laterally change the angle of the furrow wheel to compensate for tractor turning, etc.

It is apparent from the foregoing that any turning action of the tractor will cause these movements to take place, even though the manual lever 123 is not moved by the operator, due to the fact that when the lever 123 is fixed the connecting rod 117 has a right side connection with the tractor, and turning movements will naturally affect the movement of the furrow wheel both as to angling and raising and lowering.

Means is provided to limit the arc of movement of the control lever 95 relative to the arm 85 upon which it is mounted. This consists of providing stop lugs 150 upon the lever 85, at opposite sides of the lever 95, and remote from the pivot connection 91 of the lever 95. It is apparent that, due to movement of the control lever 95, there can take place only a limited degree of lifting or lowering of the furrow wheel F before the lever 95 engages one of the stops 150 and thereafter any continued lengthwise movement of the connecting rod 117 will cause the lever 85 to move for lateral or angled movement of the furrow wheel, because then the position of the lever 95 is locked with respect to the arm 85 and such continued movement of rod 117 will cause rotation of the shaft 70.

Figure 5:
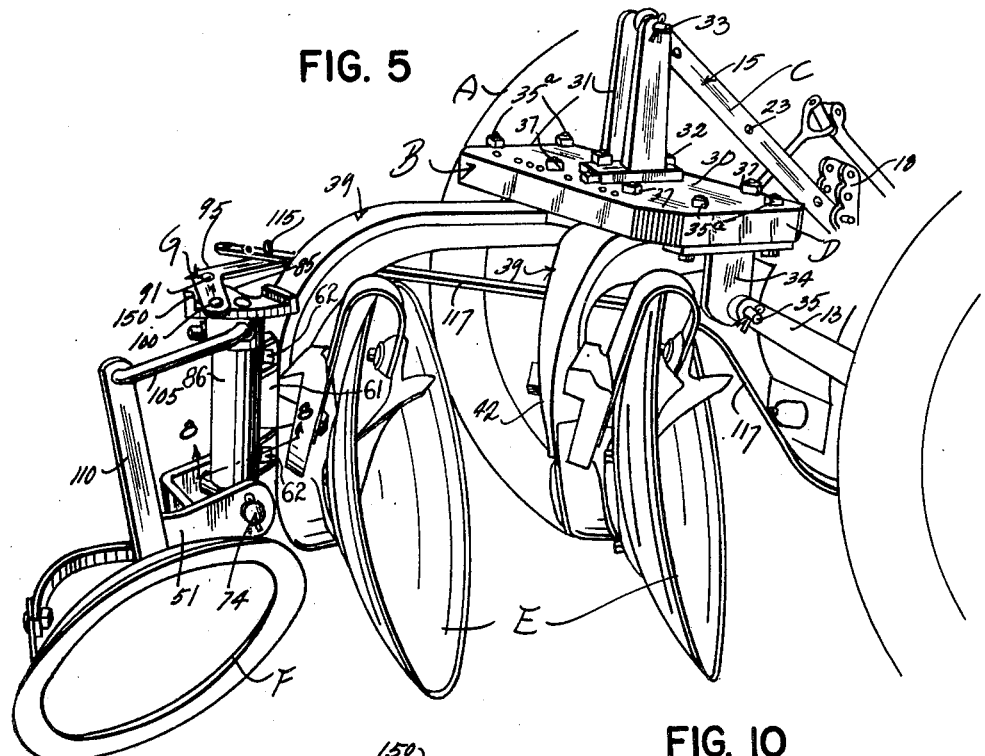
Fig. 5 is a perspective view taken from the right side of the plow construction to the rear thereof, showing the lifted position of plows upon a tractor.

The operation of the hitch mechanism C for lifting and lowering the plow mechanism bodily is well known in the art to which the invention relates. Suffice to say that the entire plow construction can be lifted above ground to a position such as shown in Fig. 5 for transportation, and of course the same hitch mechanism can be raised and lowered for the depth regulation of plowing.

Of course it will be well understood that the entire plow frame construction is of heavy metal and that is also true of the furrow wheel.

With respect to lateral turning movements of the furrow wheel F with respect to the plow frame B, the lever 95 is rigidly connected to the top of a pin 91. This pin or shaft 91 rotates on an upright axis upon the movable end of a lever 85. When the plow moves sidewise at an angle with respect to the tractor, due to the tractor making turns and following curves (since relative movement of the plow is permitted with respect to the line or axis of the tractor through the loose linkage C) the end of arm 95 closer to the furrow wheel, after an initial movement, will engage one or the other of the stop lugs 150 (depending upon the direction of the turn of the tractor). Continued turning of the tractor will cause the lever 95 to move the lever 85 and turn the hinge pin 70 in its bearing. This through connection of the hinge pin 70 with the shaft 74 and portions 80, 81 and 82 and arm 51 will cause lateral angled movement of the furrow wheel F. The furrow wheel stays in its position in the furrow while tractor steering or turning is taking place; being held downward by the connection of link 105 with the upstanding arm 110. With this combination, the proper amount of pressure of the wheel on the ground is maintained in order to keep the plow alignment perfect with respect to the tractor line while making turns or travelling around curves.

Limited vertical movement of the furrow wheel to take care of ground unevenness and soil conditions, depending upon the consistency of the soil, whether it is loose, sandy or hard clay, is permitted as the lever 95 moves in the space between the stop lugs 150, when not in contact with them.

Referring more particularly to directional plowing with the implement B, when the tractor A is making a right hand turn, the implement B will, due to the fact that the hitch mechanism C has a loose lateral movement, have an initial tendency to maintain its previous position with respect to the tractor and it moves to the right to a less degree than the tractor. Through the connecting link 117 the steering arm 85 is moved in a backward direction when the arm 95 engages the rear stop 150. Then the shaft 70 will be rotated. The furrow wheel at its most forward part will then be angled to the left of the line of the plow frame so as to conform to the curvature being made. In turn, this permits the cutting width of the furrow to be substantially equal to the cut of the furrow during straight away plowing. In making a left turn the action will be the reverse.

The ground pressure of the furrow wheel F required to hold the plow discs in position is obtained by the action of the control lever 95, its connecting linkage, and the connecting or control bar 117.

With these controls the correct amount of pressure to control the plow is automatically delivered to the control and linkage construction by the tendency of the plow to move to the left because of the angled position of the plowing discs. This action upon the furrow wheel prevents undue strain upon the tractor under various soil conditions requiring variations in draft. The automatic control is economical from the standpoint of fuel saved in operating the tractor.

In plowing upon sloping ground the action of the furrow wheel is very similar to that of making curves on level lands, except the tendency of the plow to swing down the slope through gravity will, through the linkage, move the furrow wheel downward with respect to the furrow, thereby permitting the plowing discs to be placed more in line with the tractor and to cut a natural swath of soil. This action is true whether the plow is turning the soil either up slope or down slope.

The manual control lever is provided to aid in properly positioning the plow on sloping soils.

In my Patents 2,704,496, dated March 22, 1955 and 2,735,348, dated February 21, 1956, I have shown constructions for effectively manipulating the furrow wheel under different soil and plowing conditions. However, in the present invention the movements of lifting and lowering and lateral positioning of the furrow wheel are so integrated, through the control linkage, that the furrow wheel is properly and automatically positioned according to varying soil conditions, slope of ground, and turning of the tractor.

Figure 8:
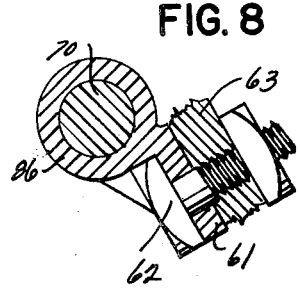
Fig. 8 is a cross sectional view taken substantially on the line 8—8 of Fig. 5, showing more particularly the means of bracket connecting the furrow control construction and linkage to the plow frame.
Figure 11:
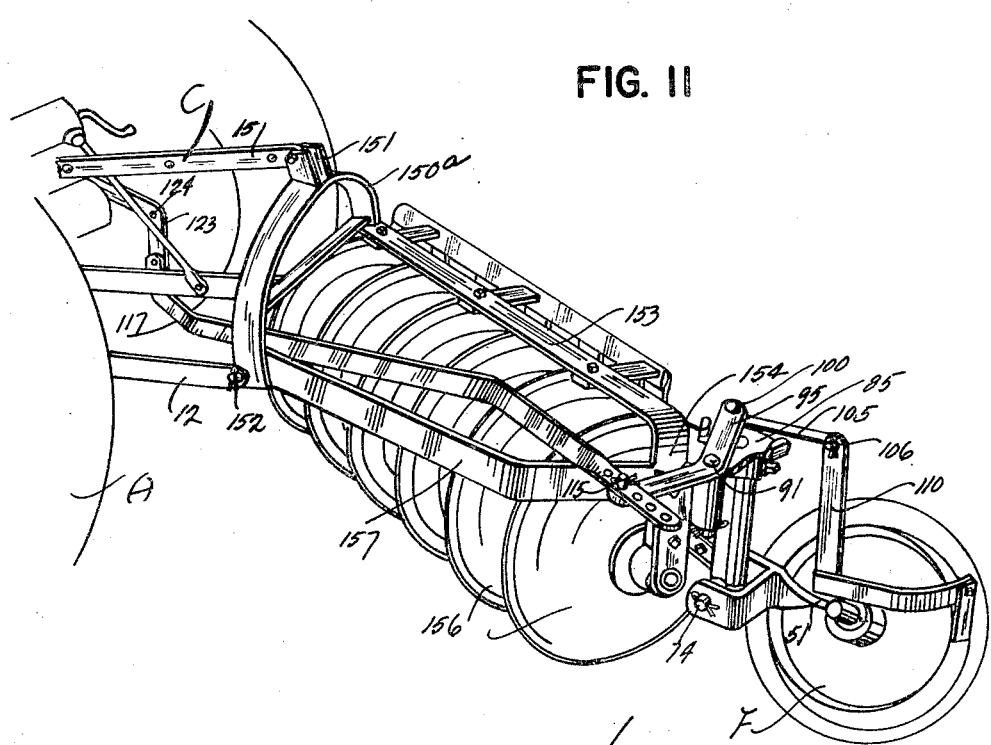
Fig. 11 is a perspective view of a tiller type of plow construction, embodying the same features of furrow wheel control as shown in the preferred form of invention in Figs. 1 to 10 inclusive.
Figure 12:
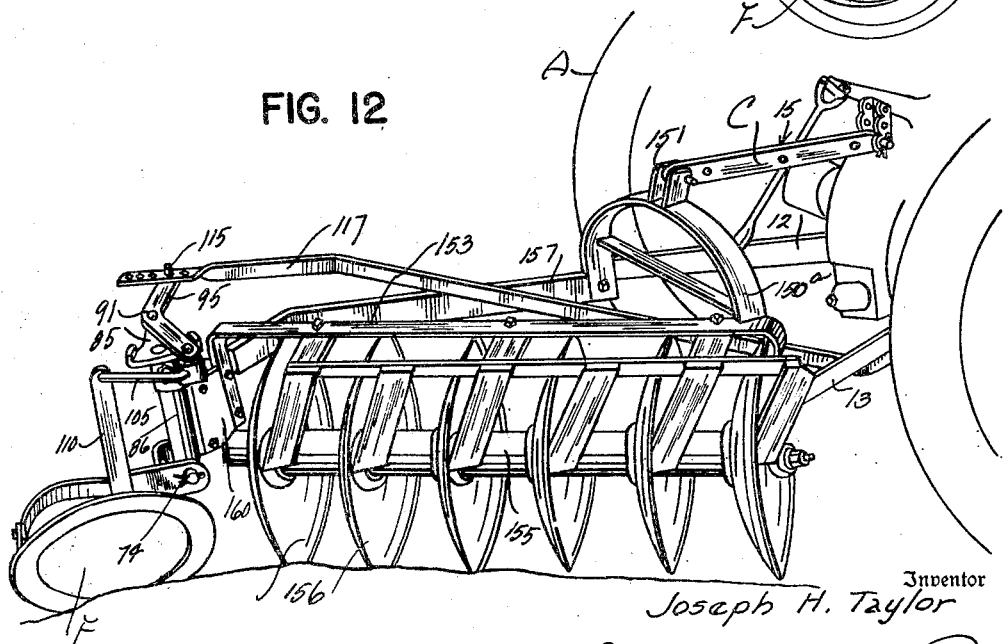
Fig. 12 is another perspective view of the tiller construction of Fig. 11.

Referring to the tilling implement shown in Figs. 11 and 12, the same includes an inverted U-shaped supporting frame 150ª having a top connection at 151 with the compression linkage 15. The lower ends of the inverted U-shaped frame 150ª have connections 152 with the tension links of the hitch mechanism. Furthermore, the framework of the tiller also includes a main rear beam 153 provided with end depending legs 154, rotatably supporting the shaft mechanism 155 upon which the plow discs 156 are connected. The frame structure also includes a diagonally disposed connecting member 157 which connects one of the legs 154 with the U-shaped frame portion 150ª. To this leg 154 is connected a bracket 160 which corresponds to the flange 61 of the sleeve 86, as shown in Fig. 8. The furrow wheel F of this tiller is connected to the frame and tractor in the same manner as above described for the preferred embodiment of this invention, and similar reference characters identify like parts in both forms of the invention. The tiller shaft construction 155 is of the type disclosed in my Patent 2,704,496, dated March 22, 1955.

Various changes in the shape, size, and arrangement of parts may be made to the form of invention herein shown and described, without departing from the spirit of the invention or scope of the claims.

I claim:
1. In a plow construction the combination of a plow frame having a plow element connected therewith, a furrow wheel, having a pintle upon which the furrow wheel is rotatably mounted, a forwardly extending lever fixed with said pintle, a transverse shaft upon the forward end of said lever, an upright shaft having a transverse sleeve at the lower end thereof in which the said transverse shaft of the lever bears, means connected to the plow frame providing a fixed axial bearing for the upright shaft, a laterally extending lever fixed with the upright shaft for movement to turn said upright shaft and laterally angle the furrow wheel, a control lever pivoted intermediate its ends about an upright axis upon the lever which is connected to the upright shaft and remote from the axis of said upright shaft, means on the laterally extending lever providing stops to limit the degree to which the control lever may move upon its pivot axis, and linkage means connecting one end of the control lever to the furrow wheel connected lever for raising and lowering it upon movement of the control lever on its pivot axis.

2. A plow construction as defined in claim 1 wherein a tractor connectable connecting rod is connected to the control lever at the opposite side of its pivot axis of the control lever with respect to its linkage connected means of the furrow wheel lever for operation of said control lever and the lever to which it is connected.

3. In a tractor drawn plow construction the combination of a main frame having a plow element connected therewith, means for connection of the main frame to a tractor hitch linkage whereby turning of the tractor will cause angled turning of the main frame to a less degree than the degree of turning of the tractor, a furrow wheel, means mounting the furrow wheel upon the main frame on a transverse axis including a lever for raising and lowering of the furrow wheel, said last mentioned means including means providing an upright axis fixed with respect to the main frame, a second lever pivoted for turning movement about said upright axis, a third lever pivoted about a second upright axis upon said second lever spaced from the upright axis first mentioned, a linkage mechanism connecting the third lever to the first lever for raising and lowering the furrow wheel upon movement of the second lever which is pivoted upon the first mentioned upright axis, and means connecting the third lever at the opposite side of the first mentioned upright axis with respect to the connection of the third lever with said linkage, including a rod connected to the tractor for forward and rearward movements proportionate to relative turning movement of the tractor and main frame for swing said third lever.

4. A plow construction as defined in claim 3 in which the second lever is provided with fore and aft stops in position to be engaged by the third lever for limited turning of the third lever about its upright axis independent of the pivoting movement of the second lever.

References Cited in the file of this patent

UNITED STATES PATENTS

| 1,390,578 | Nichols | Sept. 14, 1921 |
| 2,098,472 | Strandlund | Nov. 9, 1937 |
| 2,467,111 | Coon | Apr. 12, 1949 |
| 2,608,145 | Knapp | Aug. 26, 1952 |
| 2,617,344 | Carney | Nov. 11, 1952 |
| 2,635,517 | Silver et al. | Apr. 21, 1953 |
| 2,637,258 | Silver et al. | May 5, 1953 |
| 2,637,260 | Silver et al. | May 5, 1953 |
| 2,691,931 | Wilson | Oct. 19, 1954 |
| 2,732,781 | Coviello | Jan. 31, 1956 |